United States Patent
Kavanagh

(10) Patent No.: US 7,418,253 B2
(45) Date of Patent: Aug. 26, 2008

(54) METHOD, SECURITY SYSTEM CONTROL MODULE AND POLICY SERVER FOR PROVIDING SECURITY IN A PACKET-SWITCHED TELECOMMUNICATIONS SYSTEM

(75) Inventor: Alan Kavanagh, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 385 days.

(21) Appl. No.: 11/182,789

(22) Filed: Jul. 18, 2005

(65) Prior Publication Data

US 2006/0013191 A1  Jan. 19, 2006

Related U.S. Application Data

(60) Provisional application No. 60/588,750, filed on Jul. 19, 2004.

(51) Int. Cl.
  *G06F 17/00* (2006.01)
(52) U.S. Cl. .............................. 455/410; 726/1
(58) Field of Classification Search ................ None
  See application file for complete search history.

(56) References Cited

U.S. PATENT DOCUMENTS 6,829,486 B2 * 12/2004 McKenna et al. ........... 455/464
2002/0075844 A1 * 6/2002 Hagen ...................... 370/351
2004/0003032 A1   1/2004 Ma et al. .................. 709/203
2006/0094400 A1 * 5/2006 Beachem et al. ........... 455/410

* cited by examiner

Primary Examiner—Lester Kincaid
Assistant Examiner—Joel Ajayi
(74) Attorney, Agent, or Firm—Alex Nicolaesco; Ericsson Canada Inc.

(57) ABSTRACT

A method, security system control module and policy server for providing security for Mobile Stations (MSs) in a Packet-Switched Telecommunications System. When an MS accesses the system, its identity is sent to a security system control module that retrieves a security profile associated with the MS. A policy server of the security system control module stores individual security profiles, default security profiles and group security profiles for registered subscribers. Security settings associated with the MS security profile are returned from the policy server to a mobile security manager of the control module, which then determines if they should be propagated in the system. When no previous network access was made in a given time period by an MS having similar security settings, i.e. belongs to the same group security profile, the settings are propagated in the system in order to be enforced, for providing security protection for the MS.

12 Claims, 6 Drawing Sheets

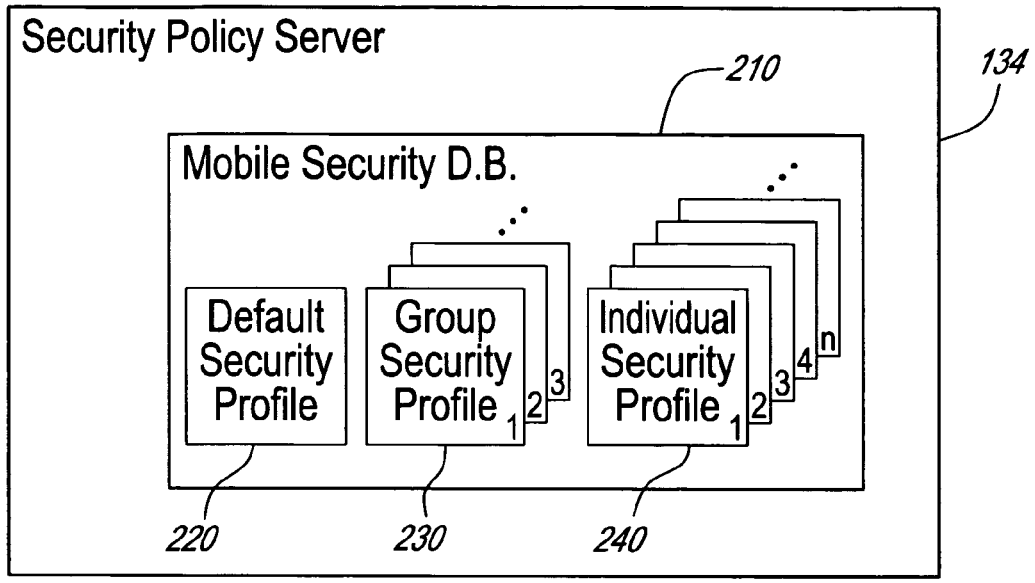
| Default Security Profile ||
|---|---|
| Anti-Virus Protection | ON |
| SPAM Filtering | OFF |
| Content Filtering (Adult) | OFF |
|  | OFF |
| ⋮ | OFF |

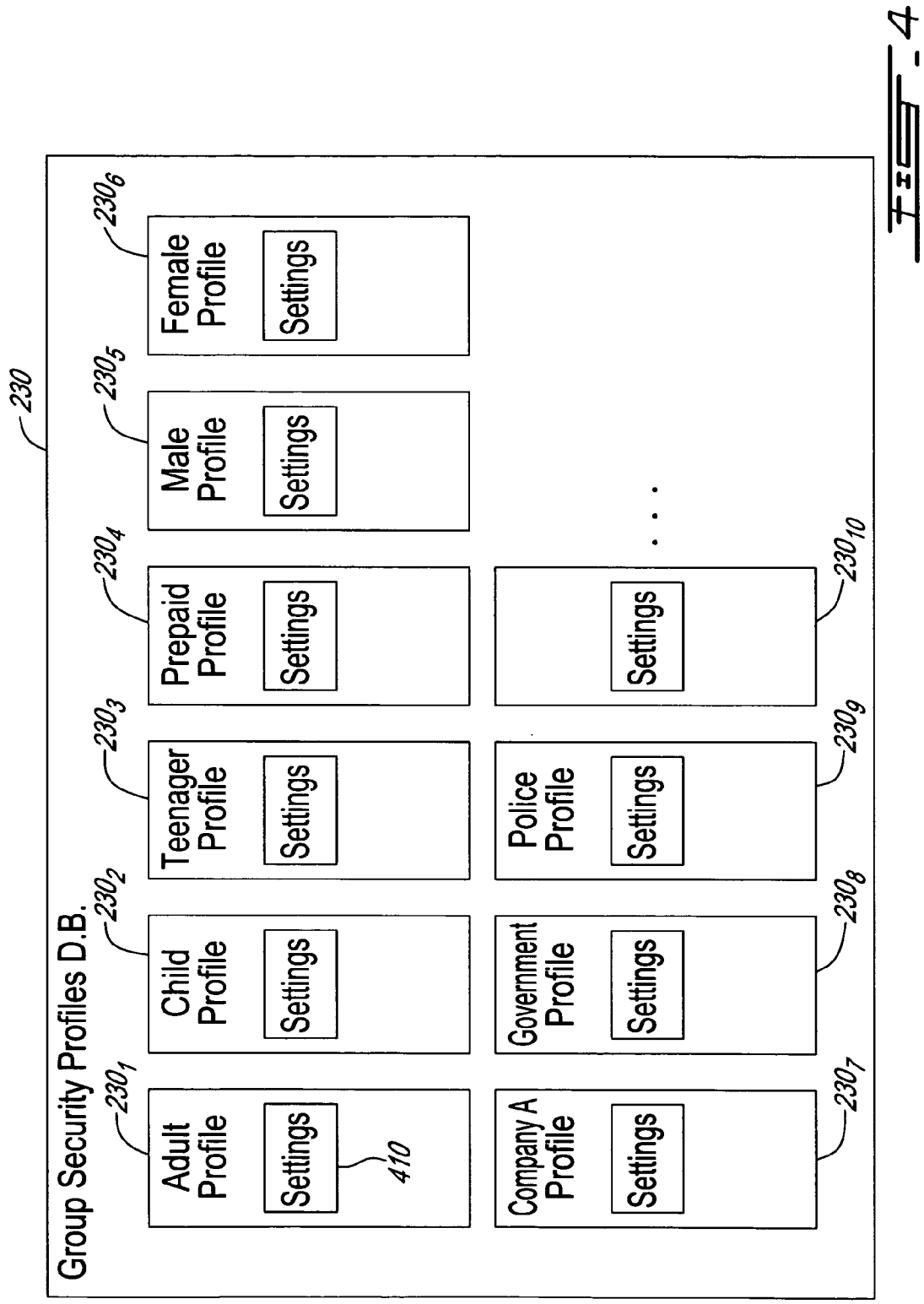

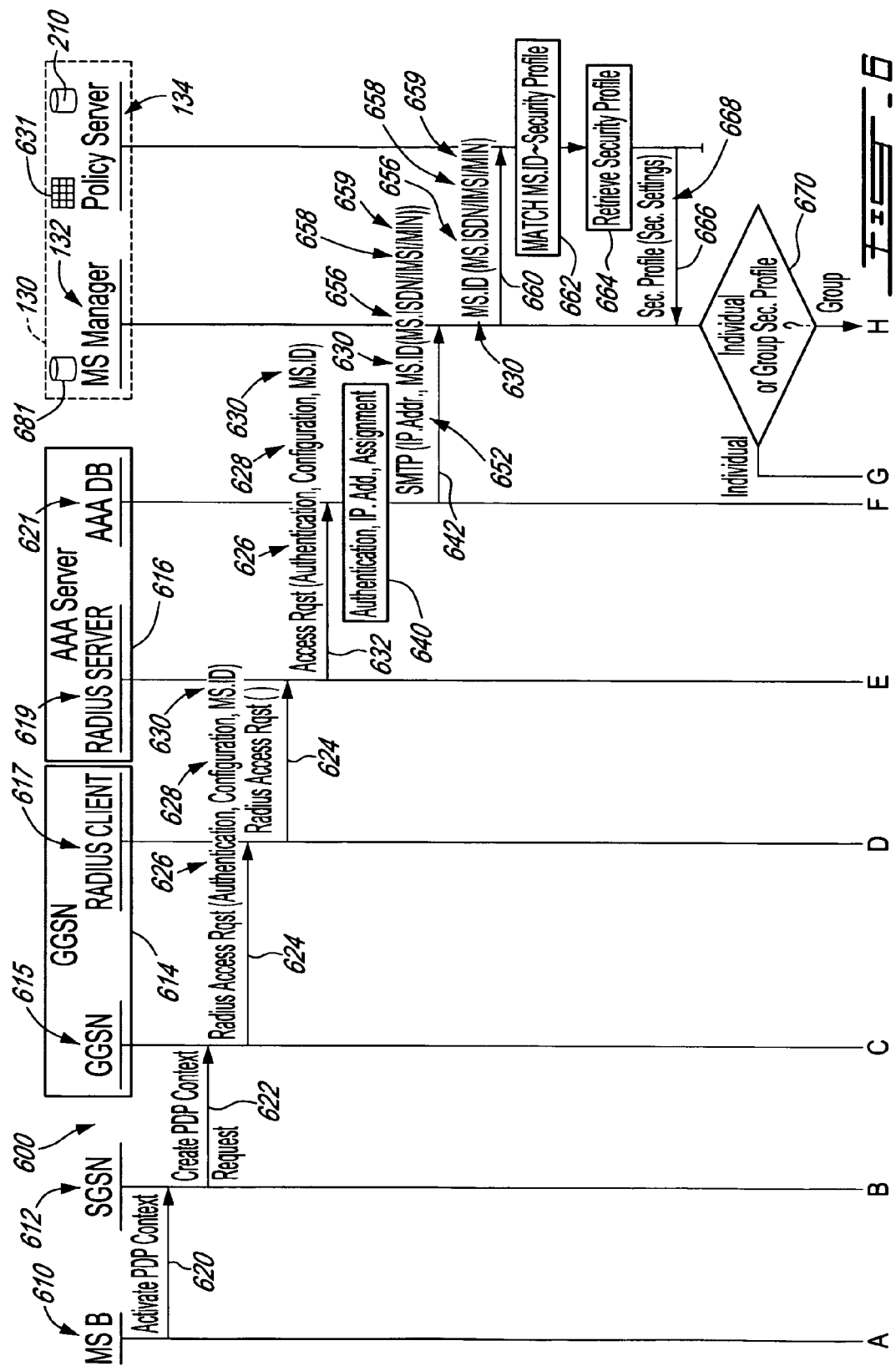

METHOD, SECURITY SYSTEM CONTROL MODULE AND POLICY SERVER FOR PROVIDING SECURITY IN A PACKET-SWITCHED TELECOMMUNICATIONS SYSTEM

PRIORITY STATEMENT UNDER 35 U.S.C S.119 (e) & 37 C.F.R. S.1.78

This non-provisional patent application claims priority based upon the prior U.S. provisional patent application entitled "Mobile Security Zone", application No. 60/588,750 filed Jul. 19, 2004 in the name of Alan KAVANAGH of Montreal, Canada.

BACKGROUND OF THE INVENTION

1. Field of the Invention

The present invention relates to the field of communications security in data packet telecommunications networks.

2. Description of the Related Art

In the last two decades, cellular systems emerged as the new preferred way of communications among human beings. Such systems include Base Stations (BSs) that provide radio coverage for subscriber's Mobile Stations (MSs) within the boundaries of so-called radio cells, so that MSs can communicate among each other and with subscribers of Public Switched Telephone Networks (PSTNs), or further access various networks such as the Internet and/or intranets. Such communications are rendered possible using one or more packet switched nodes of the cellular system, which may in turn also be connected with a switching node of the PSTN and/or with a gateway to the Internet.

Cellular system evolved from their first generation (1G) when radio coverage was based on analog-type transmissions, to the second generation (2G) of cellular systems where the radio signals were transformed into a digital format before being relayed to the other participant to the call. This helped to improve both the quality of the transmitted voice signal and the radio spectrum efficiency of the cellular networks.

Nowadays, cellular systems have further evolved to the so-called $3^{rd}$ Generation (3G) systems, where communications are performed in digital format from end-to-end of the communication path, in the form of data packets, over en entirely packet-switched telecommunications network. In 3G systems, data packet addressing is based on IP (Internet-Protocol) addresses. Typically, each data packet contains both the IP address of the packet sender and the IP address of the intended packet recipient, so that the packet can be properly routed along the data packet network and the Internet to its intended destination.

Data packets communications are more deficient in terms of security than the 1G and 2G communications. In 1G and 2G cellular systems, the communication paths were based on circuit-switched signaling and were dedicated, i.e. the communications channels were exclusively used by the participants to the particular voice or data communication. This is no longer the case in 3G systems, where the communications data packets are IP-based and thus inherit the IP traffic characteristics. For example, in 3G systems, IP data packets may take various paths from the sender to the receiver. Some communications may also involve the Internet and intermediate IP networks, which therefore adds all the known security risks associated with the Internet and the IP networks to the cellular telecommunications. This situation makes the 3G communications prone to security attacks of various types, such as for example but not limited to denial of service attacks, spam attacks, virus' worms, Trojan-type viruses, spyware, session hijacking and man-in-the-middle attacks.

Other security drawbacks are further associated with the present 3G cellular systems. For example, 3G subscribers make use of email and MMS (Multimedia Messaging System) communications, which may carry viruses alike the ones known in PC-based Internet email communications. Such viruses may infect the subscriber MSs, create hardware and/or software problems in the terminal by preventing normal operation and even generate traffic interruption, thus preventing the subscriber from using his MS, and reduce the telecom operator's revenues and reputation. Another weakness of existing 3G systems is that 3G subscribers are prone to receiving email or MMS spam, which create undue data traffic in the network.

To summarize, the impacts of such attacks on a given MS may lead to:

Downtime of mobile user;

Prevent the MS from normal use;

Tarnish telecom operators reputation;

Prevent user from making calls on 3G handsets, including 911 calls;

Loss of service, i.e. loss of revenue for the operators;

Deter users from using service as Internet access, resulting in a decrease of revenues for the operators;

Snooping of ongoing communications; and

Impersonation of users resulting from session hijacking.

Conclusively, the telecom operators' current security solutions leave them open to a plethora of attacks all of which have different effects on both the mobile user and the network itself and fail to offer a security solution flexible enough to meet each of the mobile subscribers requirements.

Determinedly, today's Mobile Network Operators (MNOs) provide no adequate security for MS users. At best, a minimal protection is offered using Access Control Lists (ACL), which is applicable to Layers 3-4 only or State-full Packet Inspection, but does not inspect the content of the packets of prevent session hijacking, man-in-the-middle attacks, virus', spam, port scanning, and the like.

Today's MSs have no integrated security features such as firewall, anti-virus detection and spam filters or spyware detection mechanisms. Because 3G handsets are typically limited in terms of internal memory and processing capacity, at most a small and basic firewall protection can be implemented therein, though it can be cumbersome to configure, manage and update with the latest security features.

On the network side, telecom operators have at best installed a minimal security solution for insuring a perimeter defense security fence, such as a firewall on the network towards the Internet/Application Service Provider and on the borders of the site of their backbone network. However, this solution is not specifically tailored for meeting individual security needs of the different mobile users.

There are no current security solutions that offer a complete security suite for managing security for MSs and none that offer a tailorable security solution based on the MSs' requirements and/or subscription type.

Some limited security solutions are offered by some companies, which provide, for example, firewall solutions for some terminals. One such company is Bluefire Security Inc., which product called Mobile Firewall Plus™ offers a terminal-based firewall solution. However, this solution is only compatible with a few handset models, and therefore cannot offer a comprehensive security solution for an entire 3G cellular system. Furthermore, this limited solution is not customizable based on subscription type, profile of the MS subscriber and cannot be managed on a subscriber basis, nor can it be remotely managed by the MN and/or mobile network operator.

F-secure Inc. is a company that provides anti virus software for some mobile terminals as well as a network-based solution. Called F Secure Mobile Filter, this network-based solution is a content security filter for operator's value added services layer. It offers operator and service providers means for filtering content in order to block harmful software in the network before entering the mobile phones. Being a gateway solution, F-Secure Mobile Filter allows transparent protection for every device in the network with no software installed or needed in the mobile device protected.

None of these solutions respond to all of today's security needs of 3G subscribers. While today's subscribers do need security for their handsets, their level of required security may be different. In reality, mobile users have different security needs, which can depend for example of the user's age, social class, pre-paid vs post-paid account type, service categories, gender, personal interests and business/corporate needs. For example, it is easily contemplated that a male young-man of 25 years old may have a different security need on his handset than an 11 years old child, or that of a corporate user.

Mobile operators need to protect their revenue, which implies ensuring that subscribers' MSs are adequately protected. On the other hand, while insuring proper protection of subscribers' terminals, mobile operators also have to take into account subscribers preferences and particularities. However, at the present stage, mobile operators cannot provide granular security that takes into account mobile users preferences in order to provide a tailored level of security that meets the needs of the both the operators and subscribers.

Accordingly, it should be readily appreciated that in order to overcome the deficiencies and shortcomings of the existing solutions, it would be advantageous to have a method and system for effectively insuring granular security for mobile users of existing 3G cellular networks that can be tailored to suit MS users on a group or individual basis based on the subscribers needs. The present invention provides such a solution.

SUMMARY OF THE INVENTION

In one aspect, the present invention is a method for providing security protection for a Mobile Station (MS) in a packet switched cellular telecommunications network, the method comprising the steps of:
 a) responsive to an access of the network by the MS, receiving at a security system control module an identifier of the MS;
 b) based on the identifier of the MS, determining a security profile associated with the MS; and
 c) sending security settings of the security profile to one or more network nodes of the packet switched cellular telecommunications network for enforcing security for the MS.

In another aspect, the invention is a security system control module for providing security protection for a Mobile Station (MS) in a packet switched cellular telecommunications network, the module comprising:
 a mobile security manager which responsive to an access of the network by the MS, receives an identifier of the MS;
 a security policy server comprising a mobile security database storing security profiles, which receives the identifier of the MS, and based on the identifier of the MS, determines a security profile associated with the MS;

wherein the policy server sends security settings of the determined security profile to the mobile security manager, which acts to transmit the security settings to one or more network nodes of the packet switched cellular telecommunications network for enforcing security for the MS.

In yet another aspect, the invention is a security policy server comprising:
 at least one individual security profile storing security settings associated with a given subscriber of a mobile network;
 at least one default security profile storing security settings associated with subscriber of a mobile network who are assigned default security settings; and
 a plurality of group security profiles, each one group security profile from the plurality of group security profiles containing a set of security settings specific to that group security profile;
 wherein upon receiving an identifier of a Mobile Station (MS), the policy server determines a security profile associated with the MS, and returns security settings of the determined security profile for enforcing security for the MS.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 2 is an exemplary high-level block diagram of a security policy server implementing the preferred embodiment of the present invention;

FIG. 3 is an exemplary high-level representation of a default security profile according to the preferred embodiment of the present invention;

FIG. 4 is an exemplary high-level representation of a group security profile according to the preferred embodiment of the present invention;

DETAILED DESCRIPTION OF THE PREFERRED EMBODIMENTS

Figure 1:
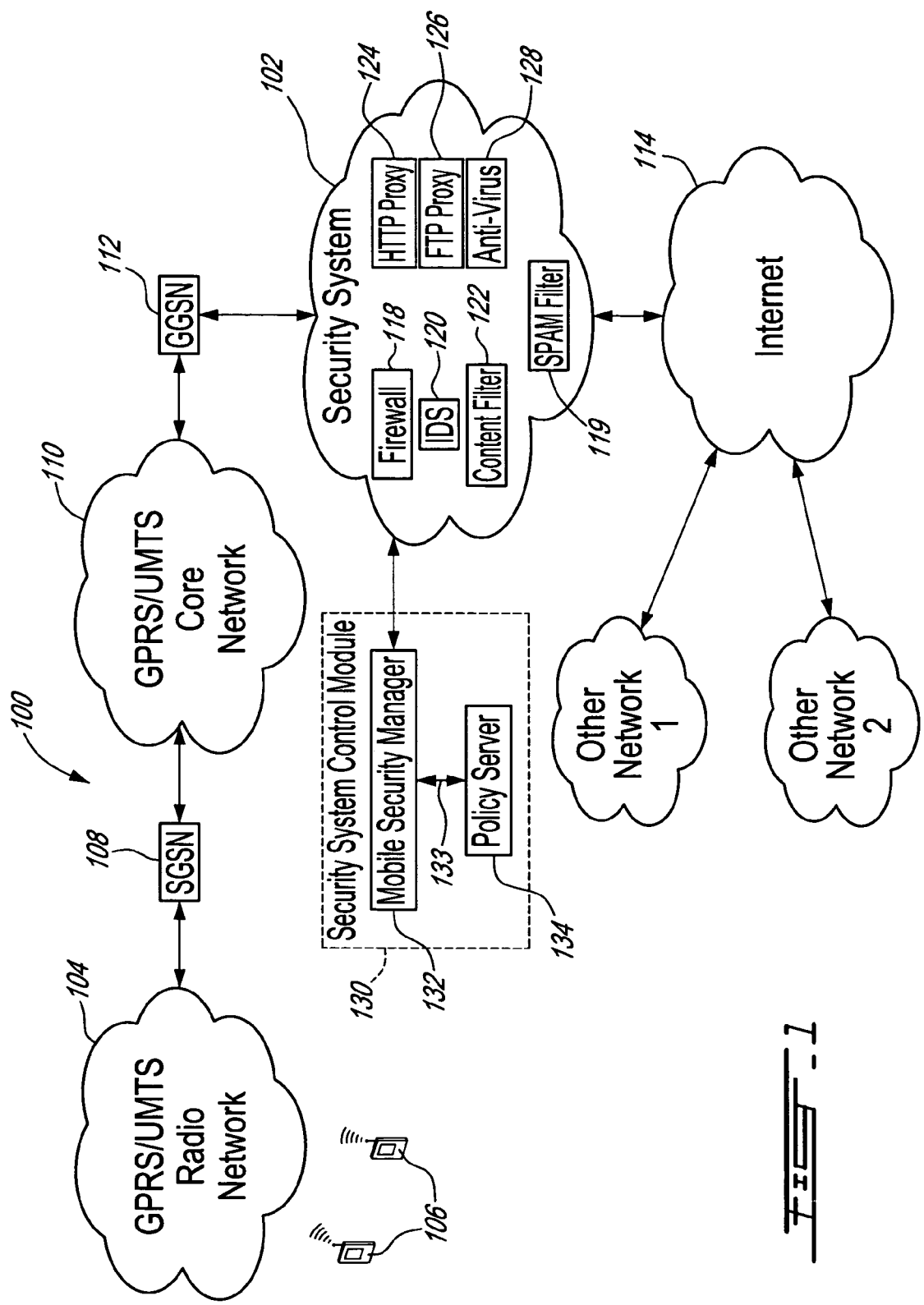
FIG. 1 is an exemplary high-level network diagram of a packet-switched telecommunications network implementing a security system according to the preferred embodiment of the present invention.

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

Mobile subscribers require different levels of security to be enforced. General requirements on mobile security include the need for mobile users equipment and data content to be protected. However, this protection should fit each subscriber's particular needs. Preferably, a good security policy implementation would also reuse the existing network Infrastructure equipment. Additionally, a node such as for example a security policy server could further provide personalized mobile security with no or minimal impact on the existing network infrastructure and equipment that is already deployed. Also, this security service could advantageously be provided by telecom operators as a value added service.

The present invention provides such as a solution. The present invention allows for protecting mobile terminals from malicious attacks such as virus' denial of service attacks, port scanning, Trojan viruses, session hijacking, man-in-the-middle attacks and privacy attacks. The present solution is also flexible in order to support current and future threats and is adaptable to the mobile user needs, habits, requirements, applications used and Operating System (OS) of the Mobile Station (MS).

In particular, the present solution provides a security system storing subscriber security profiles which contain security settings applicable for the subscribers' profile. According to the present invention, security profiles can be of various types, including but not limited to group security profiles, individual security profiles, and default security profile(s), which security settings may be based on a number of factors such as for example gender, age, social habits, hobbies, subscription type etc.

According to the present invention, an individual security profile contains security settings that are specific to a given subscriber, such that its security settings are applicable to that given subscriber. Individual security profiles may exist for a plurality of subscribers of a packet-switched cellular telecommunications network who select to personalize their security settings using, for example, an Internet portal of the network operator, through which they may select particular security settings for their individual security profile.

Each group security profile contains security settings specific to a given group of subscribers, such that its security settings are applicable to each subscriber who is part of that group. Such security groups may be constituted based on common characteristics of its subscribers, such as for example sex, age, marital status, interests, needs, etc.

The default security profile contains security settings assigned by default to all subscribers who do not select an individual security profile or do not adhere to a group security profile, such that its security settings are applicable to all such subscribers. For example, the default security profile may comprise a basic set of security features as a minimal protection requirement such as privacy and anti virus protection.

All the above-described security profiles may comprise various security settings in relation to, for example, the spam messaging blocking (for one or more of email service, short-messaging service SMS, multimedia messaging service MMS, etc), IP address blocking, Internet content filtering, anti-virus service provision, URL blocking, etc. These security settings contain information that indicates which type of protection is active for the user(s) subscribed to the security profile, and if active, how it should be applied. For example, a subscriber who selects (or defines himself) his individual security profile may subscribe to have spam messaging blocking service active for his mobile terminal, Internet content filtering for blocking adult content from the Internet, and anti-virus protection for his MS. Analogous protections may be available and provided by the network operator using either a default security profile or a group security profile applicable to a plurality of users, rather than only to one user as it is the case with an individual profile.

Reference is now made to FIG. 1, which illustrates an exemplary high-level network diagram of a packet-switched telecommunications network 100 implementing a security system 102 according to the preferred embodiment of the present invention. Shown in FIG. 1 is first a digital cellular telecommunications radio network 104, such as for example a GPRS/UMTS (General Packet-data Radio Service/Universal Mobile Telephone Service) radio network, which provides radio coverage for a plurality of MSs 106. The radio network 104 is connected through a Service GPRS Support Node (SGSN) 108 to a data packet core network 110, such as for example to a GPRS/UMTS core network. The later may comprise various packet data switching nodes, such as for example SGSNs, core routers and switches. The network 110 connects to a General GPRS Service Node (GGSN) 112, which acts as a gateway to the Internet 114 for the data traffic originated from and destined to MSs 106 served by the network 100. According to the preferred embodiment of the present invention, a security system 102 is implemented between the GGSN 112 and the Internet 114 in order to provide security protection for MSs 106. The security system 102 comprises, for example a firewall module 118 responsible for stateful packet inspection, line rate limiting, anonymity of MS users, an IDS module 120 responsible for detection against various threats such as port scanning, denial of service attacks, a content filter module 122 responsible for looking for Trojan-type viruses and stopping file sharing and streams from illicit sites and of illicit content, an HTTP Proxy 124 responsible for HTTP filtering, an FTP proxy module 126 responsible for FTP file transfer service, an antivirus module 128 responsible for virus detection and stopping this threat from reaching the mobile user, and a spam filter 119 responsible for detecting and stopping spam messaging from reaching the MSs 106. In an alternative variant of the invention, modules 118-128 may also be implemented in the GGSN 112 and/or the SGSN 108 and/or IP routers (not shown), which provides a distributed architecture to the security system 102. The system 102 is controlled by a security system control module 130 comprising a mobile security manager 132 responsible for providing the required security settings assigned to individual subscribers or groups of subscribers to the security system 102. The security system control module 130 may further comprise a security policy server 134, which stores the security settings of the individuals and other groups of subscribers mentioned hereinabove. In a first variant of the present invention the mobile security manager 132 and the security policy server 134 are co-located, while in an alternate variant they may be located at a different locations and be merely connected to each other via proper communication links 133.

By using the present architecture as described, the present invention allows for the implementation of security mechanisms that verify and filter the data content transmitted to and originating from the mobile stations 106 thus insuring protection and security for these mobile stations. Moreover, because the present invention allows for personalized levels of security to be implemented for each mobile station 106, various levels of content filtering may be implemented using the security settings provided by the security system control module 130.

As mentioned hereinbefore, a subscriber can choose between selecting an individual security profile, a group security profile, or a default security profile, wherein each of these profiles allows for different levels of security protection.

Reference is now made to FIG. 2, which is an exemplary high-level block diagram of the security policy server 134 implementing the preferred embodiment of the present invention. The server 134 includes a mobile security database 210 where the security profiles are stored. The mobile security database 210 comprises a default security profile 220, which comprises security settings that are to be assigned by default to mobile subscribers who do not select neither a group security profile nor an individual security profile. For example, a default security profile 220 may comprise a basic set of security settings that only provide for antivirus protection for the data traffic destined to subscribers who selected the default security profile. The mobile security database 210 further comprises a plurality of group security profiles 230, wherein each one of the group security profiles comprises a set of security settings specific to that group security profile, which settings are to be applied for each subscriber of that group. Such a group security profile can be created for any type of group of subscribers that require the same security protection, such as for example for employees of the same company, unrelated subscribers with particular security needs, members of a same family, company, or group, subscribers with similar interests, needs, or personality types (e.g. teenagers, adults, movie passionate, etc). Finally, the mobile security database 210 further comprises a plurality of individual security profiles 240, each one of the individual security profiles comprising a set of security settings specific to a given individual subscriber. Such individual security profile may be created by the subscriber himself, for example starting from a default security profile provided by the network operator and adding further personalization to that profile, through an interactive Internet portal of the network operator.

Reference is now made to FIG. 3, which is an exemplary high-level representation of a default security profile 220 according to the preferred embodiment of the present invention. The default security profile 220 comprises a set of security settings 300, among which, for example, only the antivirus protection is activated while all the other security settings are turned off. The default security profile 220 may explicitly comprise the identification of the security settings that are turned on and off, as shown in the exemplary FIG. 3, or alternatively may comprise only the identification of the security setting(s) that are activated without explicitly showing the ones turned off.

Reference is now made to FIG. 4, which is an exemplary high-level representation of group security profiles 230 according to the preferred embodiment of the present invention. Shown in FIG. 4 are various group security profiles $230_1$ to $230_{10}$, each one comprising a set of security settings specific to that group security profile. For example, the group security profile called "Adult Profile" $230_1$ may comprise a set of security settings 410 defining the followings:

| antivirus protection | active |
|---|---|
| spam filtering | active |
| adult content filtering | off |
| FTP service | active |

Likewise, each one of the group security profiles $230_1$ to $230_{10}$ may comprise security settings tailored for the needs of each particular group.

Figure 5:
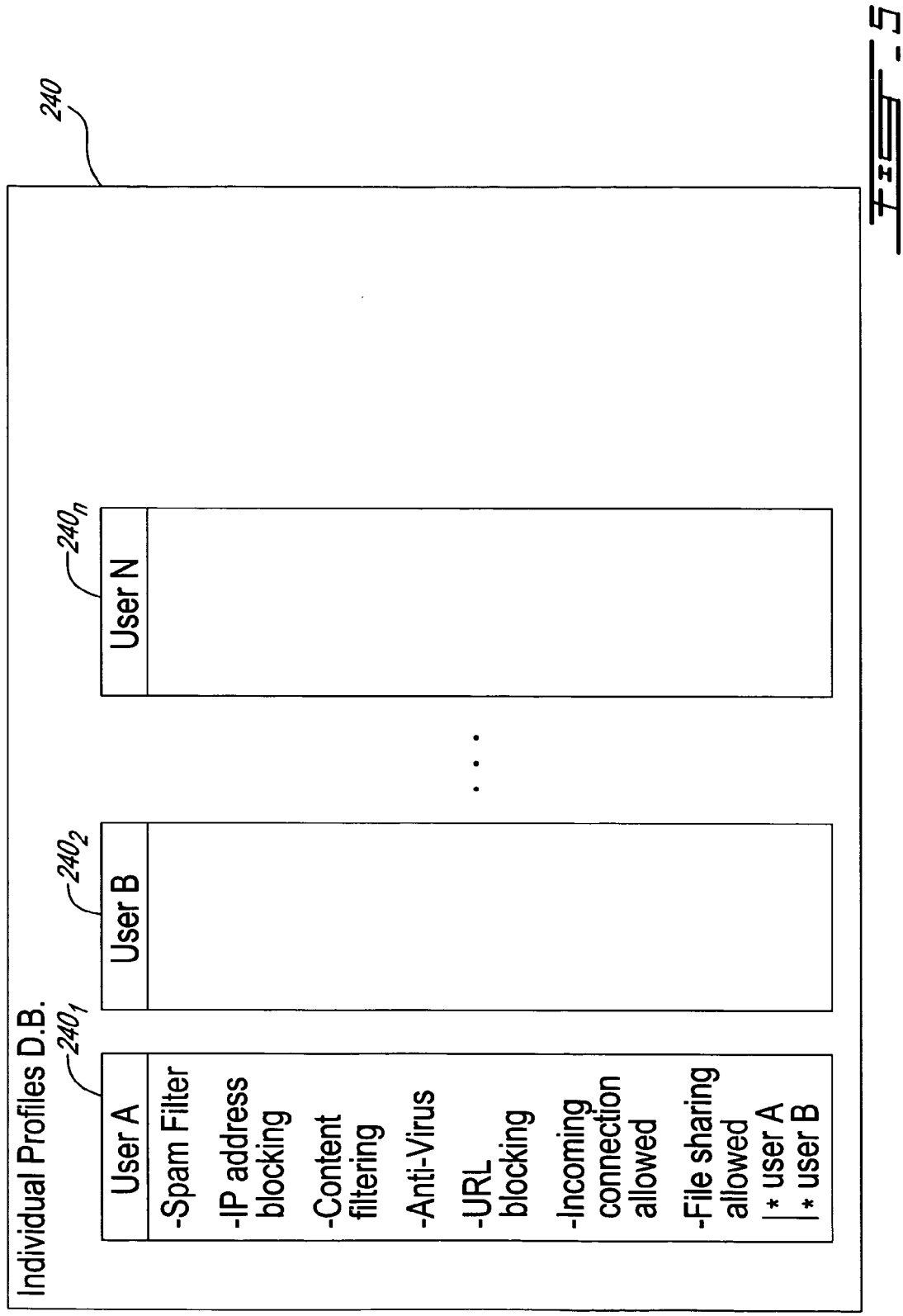
FIG. 5 is an exemplary high-level representation of individual security profiles according to the preferred embodiment of the present invention.

FIG. 5 is an exemplary high-level representation of individual security profiles 240 according to the preferred embodiment of the present invention. Shown in FIG. 5 are individual security profiles $240_1$ to $240_n$ comprising sets of security settings for n different mobile subscribers. For example, the individual profile $240_1$ contains a list of security settings for mobile subscriber A, as follows:

| spam filtering | active | |
|---|---|---|
| IP address blocking | active | specific IP address to be blocked |
| adult content filtering | active | |
| antivirus protection | active | |
| URL blocking | active | specific URL |
| incoming connection | active | |
| allow file sharing | active | with selected hosts A & B. |

Figure 6:
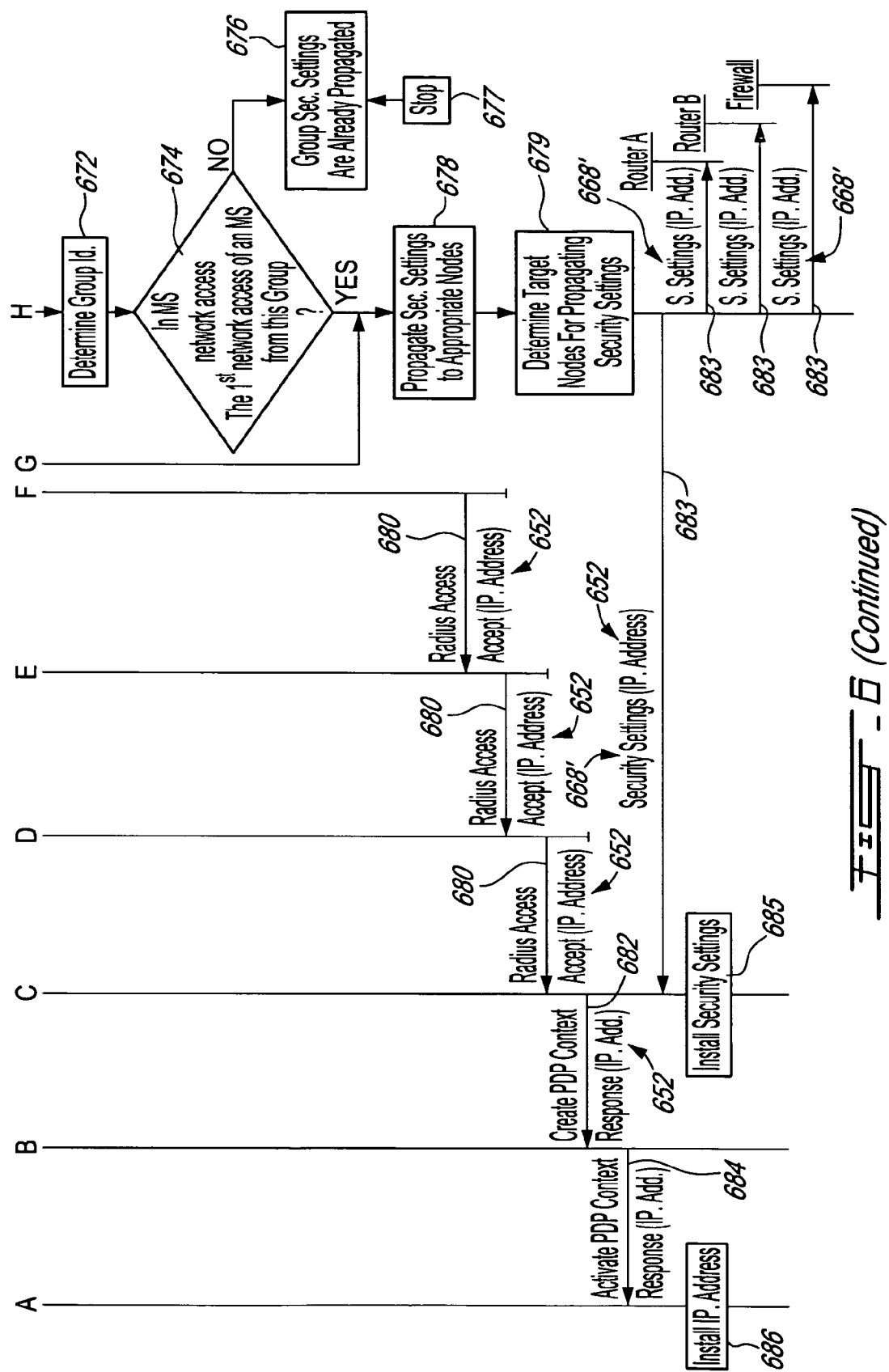
FIG. 6 is an exemplary nodal operation and signal flow diagram of a packet-switched telecommunications network implementing the preferred embodiment of the present invention.

Reference is now made to FIG. 6, which is an exemplary nodal operation and signal flow diagram of a packet-switched telecommunications network 600 implementing the preferred embodiment of the present invention. The network 600 may be, for example, a GPRS/UMTS communications network including a radio network 104 and a core network 110 as previously described in relation to FIG. 1. The network 600 comprises at least one mobile station 610, an SGSN node 612, a GGSN node 614, and an Authentication, Authorization, and Accounting (AAA) server 616. The network 600 is also connected to a security system control module 130, which comprises a mobile security manager 132 and a policy server 134 as described hereinbefore. When the MS 610 desires to establish contact with the network 600, it first issues an access message such as for example an Activate PDP Context Message 620, which is sent to the serving SGSN node 612. Upon receipt of the message 620, the SGSN 612 transmits to the GGSN 614 a Create PDP Context Request message 622, which is received at a GGSN 614 side by a GGSN functionality 615. The GGSN functionality 615 of the GGSN 614 further generates a Radius Access Request message 624, which is sent to a Radius Client 617 of the GGSN 614, and further to the AM server 616. Meantime, the GGSN 614 waits for a Radius Response message with an Access_Accept before allowing the ms 610 to access external networks and services. The message 624 comprises authentication information 626 about the MS 610, such as for example the Network Access Identifier (NAI), configuration information 628 such as for example the IP address assigned to the MS610 and type of service, and the identification of the mobile station MS_ID 630, such as for example the International Mobile Subscriber Identifier (IMSI), the Mobile Identification Number (MIN), the MS ISDN (Integrated Services Digital Network) and/or any other identification of the MS 610. The message 624 is thus relayed by the Radius Client 617 to the AAA server 616, where it is received by a Radius Server functionality 619 of the AAA server 616. The message 624 is converted into an Access Request message 632 comprising preferably the same information as the message 624, which is sent to a AAA database functionality 621 of the AAA server 616. In action 640, the AM database functionality 621 acts to authenticate and authorize the MS 610 based on the authentication information 626, the configuration information 628, and the MS identity 630, based on the MS subscription stored in the AAA database 621, and if there is needed, i.e. if no IP address has been previously assign to the MS 610, to assign an IP address 652.

According to the present invention, once the MS 610 is successfully authenticated and authorized for being provided cellular service from the network 600 and once the IP address 652 is assigned to the MS 610 in action 640 (in case no IP address assignment has been done before for the MS 610), or before (in case the MS 610 had an IP address previously assigned), the AAA database 621 transmits a security profile request message 642 to the mobile security manager 132 of the Mobile Security System control module 130 in order to request security settings to be applied for the MS 610. Message 642 preferably comprises the MS ID 630, which contains any kind of MS identification, such as for example an MS ISDN identifier 656 and/or the MS' IMSI 658 and/or the MS MIN 659, as shown. The purpose of the action 642 is that responsive to the MS 610 access of the network 600 (e.g. registration) of actions 620-632), security settings associated with the MS 610 must be implemented for insuring MS protection. Therefore, these security settings are requested from the Mobile Security Manager 132 in action 642, so that they can be propagated in the network 600 for conferring to the MS 610 the security service associated with its subscription. Action 642 may be achieved using, for example an SMTP (Simple Mail Transfer Protocol) message.

The Mobile Security Manager 132 receives the request message of action 642, and in action 660 sends to the Security Policy Server 134 the MS ID 630. In action 662, the Server 134 matches the received MS ID 630 to its corresponding security profile, the profile being associated with the MS 610. This may be done using a correspondence table 631 stored in the Policy Server 134, and which contains associations between identities of registered MSs and their corresponding security profiles. Further, in action 664 the Server 34 retrieves the determined security profile from its mobile security database 210, and returns the security settings (also called herein security rules and policies) 668 of the profile to the Security Manager 132 in action 666. Upon receipt of the security settings 668, the Security Manager 132 may determine in action 670 if the received security settings 668 belong to a group security profile or to an individual security profile. For example, in action 670, it may be determined if the Security Settings 668 are specific to the MS 610 only, or if they are part of a group security profile. If it is determined in action 670 that they belong to a group security profile, including possibly to a default security profile, in action 672 there is determined the identity of the group to which the security settings belong, and in action 674 it is further determined whether or not the current ongoing MS network access (e.g. registration) for the MS 610 is the first network access of an MS that belongs to the determined security group. Action 674 may be performed in various manners. For example, it may be detected if the current ongoing MS network access for the MS 610 is the first network access of an MS that belongs to the determined security group that occurred in predefined period of time, such as for example in the last 24 hours, or during the current day.

If it is detected in action 674 that the current ongoing MS network access for the MS 610 is not the first network access of an MS that belongs to the determined security group (e.g. as mentioned in the last 24 hours), in action 676 it is concluded that because at least one previous MS network access has recently occurred for an MS that belongs to the same security group, the group security settings 668 have been already deployed in the network 600. Because there is no need of additional security settings propagation in the network 600, the method stops in action 677.

Otherwise, if it is detected in action 674 that the current ongoing MS network access for the MS 610 is the first network access of an MS that belongs to the determined security group (e.g. in the given period of time), or if it is detected in action 670 that the security settings 668 belong to an individual profile, in action 678 it is concluded that the security settings 668 should be propagated in the network 600 for providing the MS 610 the security service associated with its subscription. In action 679, it is further determined to which network nodes (e.g GGSN 615, SGSN 612, IP routers, firewalls nodes, etc) should the security settings 668 be propagated in order to be enforced for the MS 610. This may be done, for example, by consulting a network topology database 681 stored by the Security Manager 132, which database stores the network 600 topology.

Subsequent to action 679, the Security Manager 132 starts propagating the security settings 668, or appropriate portions 668' thereof, to the appropriate network nodes, actions 683. Typically, each one of the actions 683 may include propagating at least a portion 668' of the security settings 668. Upon receipt of the appropriate security settings 668', each network node, such as for example the GGSN 615 proceeds to their installation, action 685. Subsequent to action 685, the security settings are being enforced by the appropriate network nodes for the MS 610, such as for example by the GGSN 615. For example, the GGSN 615 may have received in action 683 an anti-virus protection indication and a SPAM filtering indication associated with the IP address 652 of the MS 610. Consequently, in order to enforce the received security settings 668', the GGSN 615 acts to scan all IP data traffic destined for (or also originated by) the MS 610 having the IP address 652, in order to remove any possible virus or spam message.

The AAA server 616 also acts to propagate back to the MS 610 its assigned IP address 652 using Radius Access Accept messages 680 (in case wherein the IP address is assigned in action 640), a Create PDP Context Response Message 682, and an Activate PDP Context Response Message 684. The IP address 652 assigned by the AAA Server 616 is also registered by the GGSN node 615, so that the IP Address 652 can be installed in the MS 610, action 686.

Therefore, with the present invention it becomes possible to implement security protection for mobile subscribers in a digital mobile network, wherein the provided security protection is tailored based on the subscriber's needs.

Based upon the foregoing, it should now be apparent to those of ordinary skills in the art that the present invention provides an advantageous solution, which offers personalized security protection. Although the system and method of the present invention have been described in particular reference to certain radio telecommunications messaging standards (for example, GPRS/UMTS), it should be realized upon reference hereto that the innovative teachings contained herein are not necessarily limited thereto and may be implemented advantageously with any applicable radio telecommunications standard, such as for example with CDMA2000, or any other IP-based communications standard. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for providing security protection for a Mobile Station (MS) in a packet switched cellular telecommunications network, the method comprising the steps of:

a) responsive to an access of the network by the MS, receiving at a security system control module an identifier of the MS;
b) based on the identifier of the MS, determining a security profile associated with the MS;
c) determining whether or not the security profile associated with the MS is a group security profile;
d) when the security profile associated with the MS is a group security profile, determining when the access of the network by the MS is the first access of the network by an MS of the same security group; and
e) when the access of the network by the MS is the first access of the network by an MS of the same security group during a given period of time, sending security settings of the security profile to one or more network nodes of the packet switched cellular telecommunications network for enforcing security for the MS.

2. The method claimed in claim 1, wherein the identifier of the MS comprises one of an MS ISDN (Integrated Services Digital Network), a MIN (Mobile Identification Number) and an IMSI (International Mobile Subscriber Identity), and wherein step b) comprises the step of matching the MS identifier with the security profile.

3. The method claimed in claim 1, wherein the security profile contains settings for enforcing security protection for the MS.

4. The method claimed in claim 1, wherein the security settings comprise one or more settings from the group of settings consisting of:
Spam filtering;
IP address blocking;
Adult content filtering; and
Anti-virus protection.

5. A security system control module for providing security protection for a Mobile Station (MS) in a packet switched cellular telecommunications network, the module comprising:
a mobile security manager which responsive to an access of the network by the MS, receives an identifier of the MS;
a security policy server comprising a mobile security database storing security profiles, the server receiving the identifier of the MS, and based on the identifier of the MS, acting to determine a security profile associated with the MS;
wherein the policy server sends security settings of the determined security profile to the mobile security manager, which determines whether or not the security profile associated with the MS is a group security profile, and when the security profile associated with the MS is a group security profile, further acts to determine when the access of the network by the MS is the first access of the network by an MS of the same security group during a given period of time and when so, transmits the security settings to one or more network nodes of the packet switched cellular telecommunications network for enforcing security for the MS.

6. The security system control module claimed in claim 5, wherein the identifier of the MS comprises one of an MS ISDN (Integrated Services Digital Network), a MIN (Mobile Identification Number) and an IMSI (International Mobile Subscriber Identity), and wherein the policy server comprises a correspondence table containing associations between identities of registered MSs and corresponding security profiles, and for determining the security profile associated with the MS, the policy server matches the MS identifier with the security profile using the correspondence table.

7. The security system control module claimed in claim 5, wherein the security profile contains settings for enforcing security protection for the MS.

8. The security system control module claimed in claim 5, wherein the security settings comprise one or more settings from the group of settings consisting of:
Spam filtering;
IP address blocking;
Adult content filtering; and
Anti-virus protection.

9. A method for providing security protection for a Mobile Station (MS) in a packet switched cellular telecommunications network, the method comprising the steps of:
a) responsive to an access of the network by the MS, receiving at a security system control module an identifier of the MS;
b) based on the identifier of the MS, determining a security profile associated with the MS;
c) determining whether or not the security profile associated with the MS is a group security profile;
d) when the security profile associated with the MS is a group security profile, determining when the access of the network by the MS is the first access of the network by an MS of the same security group; and
e) when the access of the network by the MS is not the first access of the network by an MS of the same security group, refraining to propagate the security settings of the security profile to network nodes of the packet switched cellular telecommunications network.

10. A security system control module for providing security protection for a Mobile Station (MS) in a packet switched cellular telecommunications network, the module comprising:
a mobile security manager which responsive to an access of the network by the MS, receives an identifier of the MS;
a security policy server comprising a mobile security database storing security profiles, the server receiving the identifier of the MS, and based on the identifier of the MS, acting to determine a security profile associated with the MS;
wherein the policy server sends security settings of the determined security profile to the mobile security manager, which determines whether or not the security profile associated with the MS is a group security profile, and when the security profile associated with the MS is a group security profile, further acts to determine when the access of the network by the MS is not the first access of the network by an MS of the same security group during a given period of time and when this is the case, the mobile security manager refrains from propagating the security settings of the security profile to network nodes of the packet switched cellular telecommunications network.

11. A mobile security manager of a security system for providing security protection for a Mobile Station (MS) in a packet switched cellular telecommunications network, the manager being adapted to receive an identifier of the MS responsive to an access of the network by the MS and to send the MS identifier to a security policy server for receiving back a security profile associated with the MS, the mobile security manager being further adapted to determine whether or not the security profile associated with the MS is a group security profile, and when this is the case, to further act to determine when the access of the network by the MS is the first access of the network by an MS of the same security group during a given period of time and when this is the case, to transmit the security settings to one or more network nodes of the packet switched cellular telecommunications network for enforcing security for the MS.

12. A mobile security manager of a security system for providing security protection for a Mobile Station (MS) in a packet switched cellular telecommunications network, the manager being adapted to receive an identifier of the MS responsive to an access of the network by the MS and to send the MS identifier to a security policy server for receiving back a security profile associated with the MS, the mobile security manager being further adapted to determine whether or not the security profile associated with the MS is a group security profile, and when this is the case, to further act to determine when the access of the network by the MS is not the first access of the network by an MS of the same security group during a given period of time and when this is the case, the mobile security manager being configured to refrain from propagating the security settings of the security profile to network nodes of the packet switched cellular telecommunications network.

* * * * *